United States Patent Office 3,235,303
Patented Feb. 15, 1966

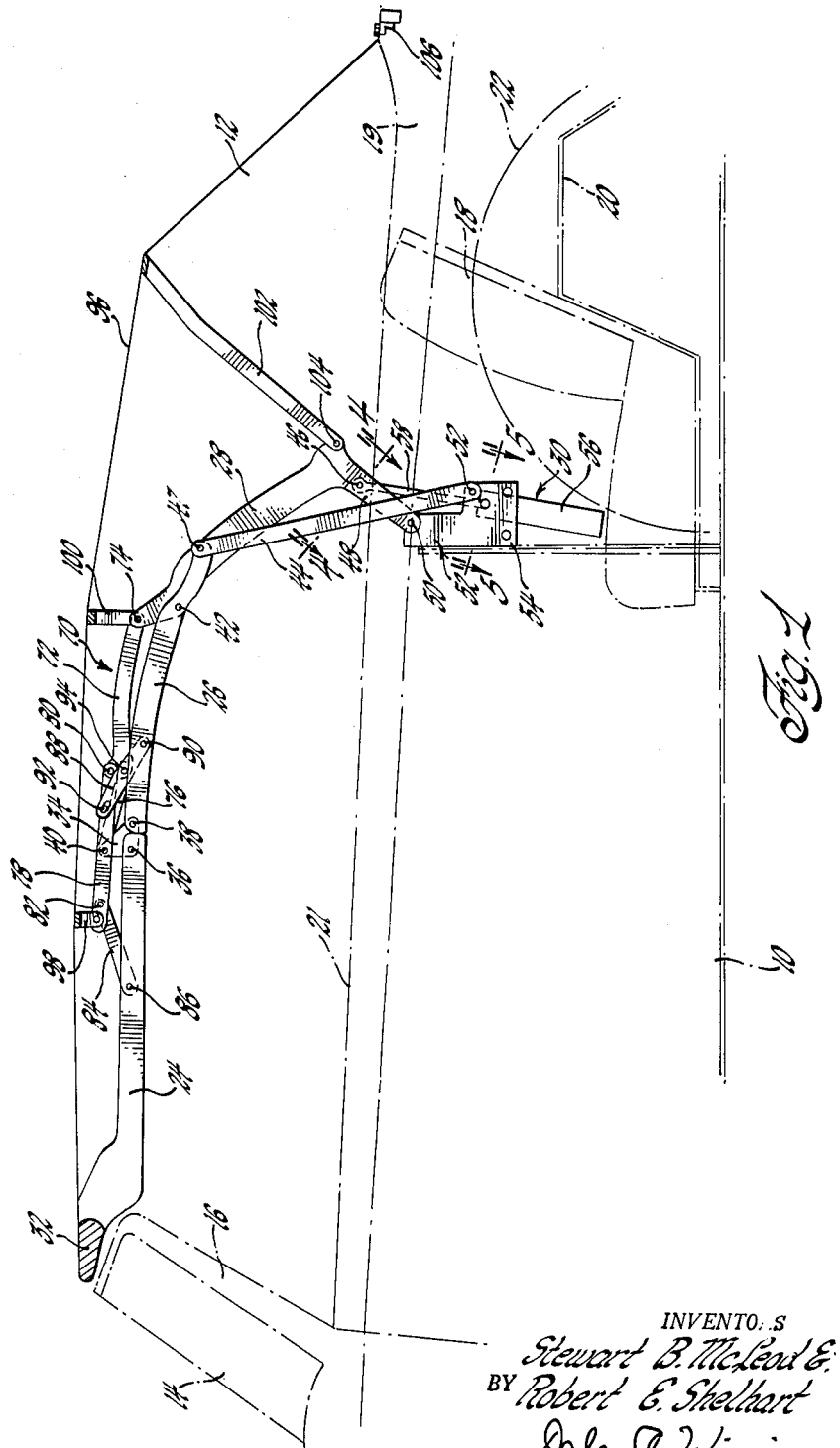

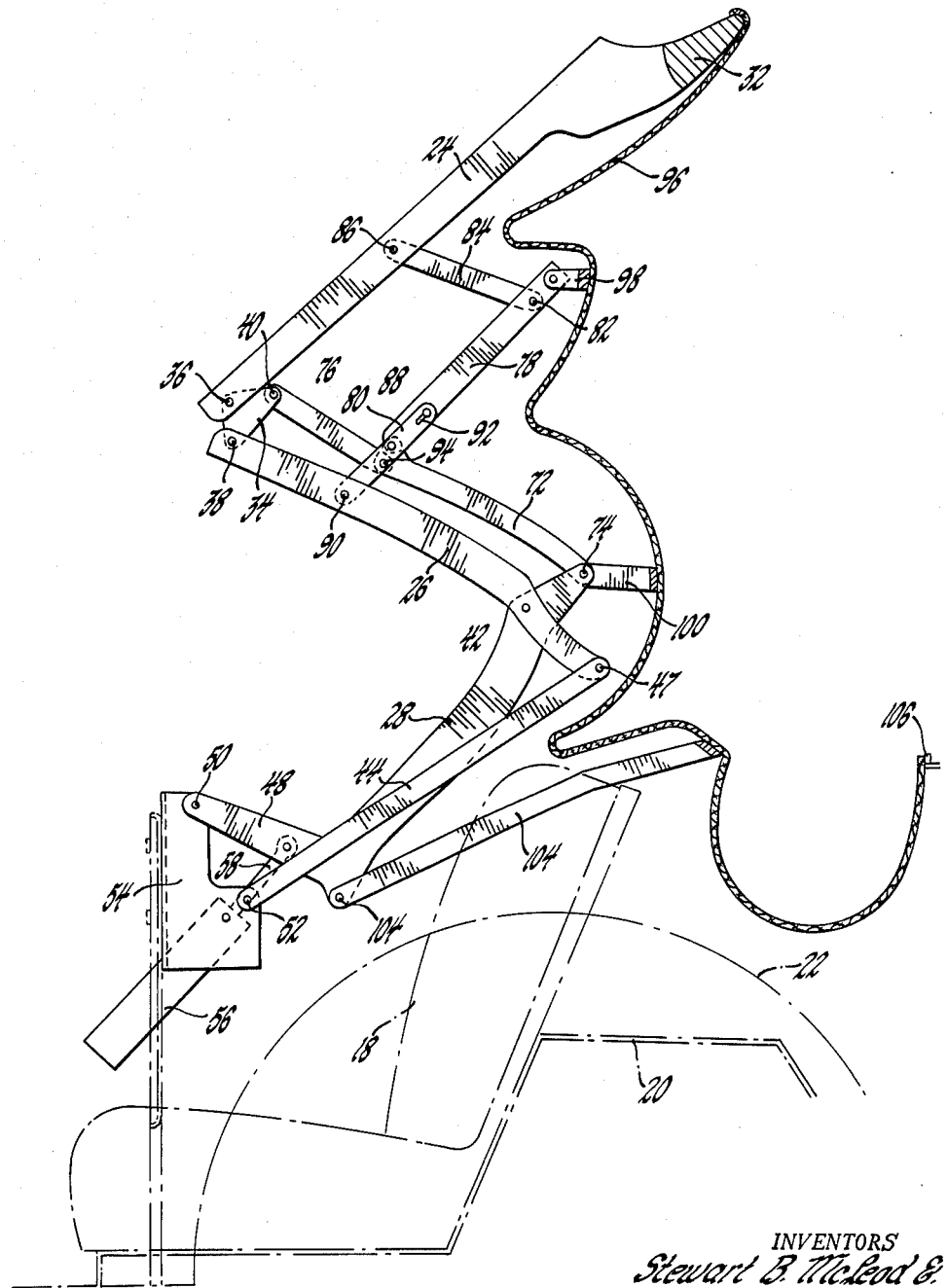

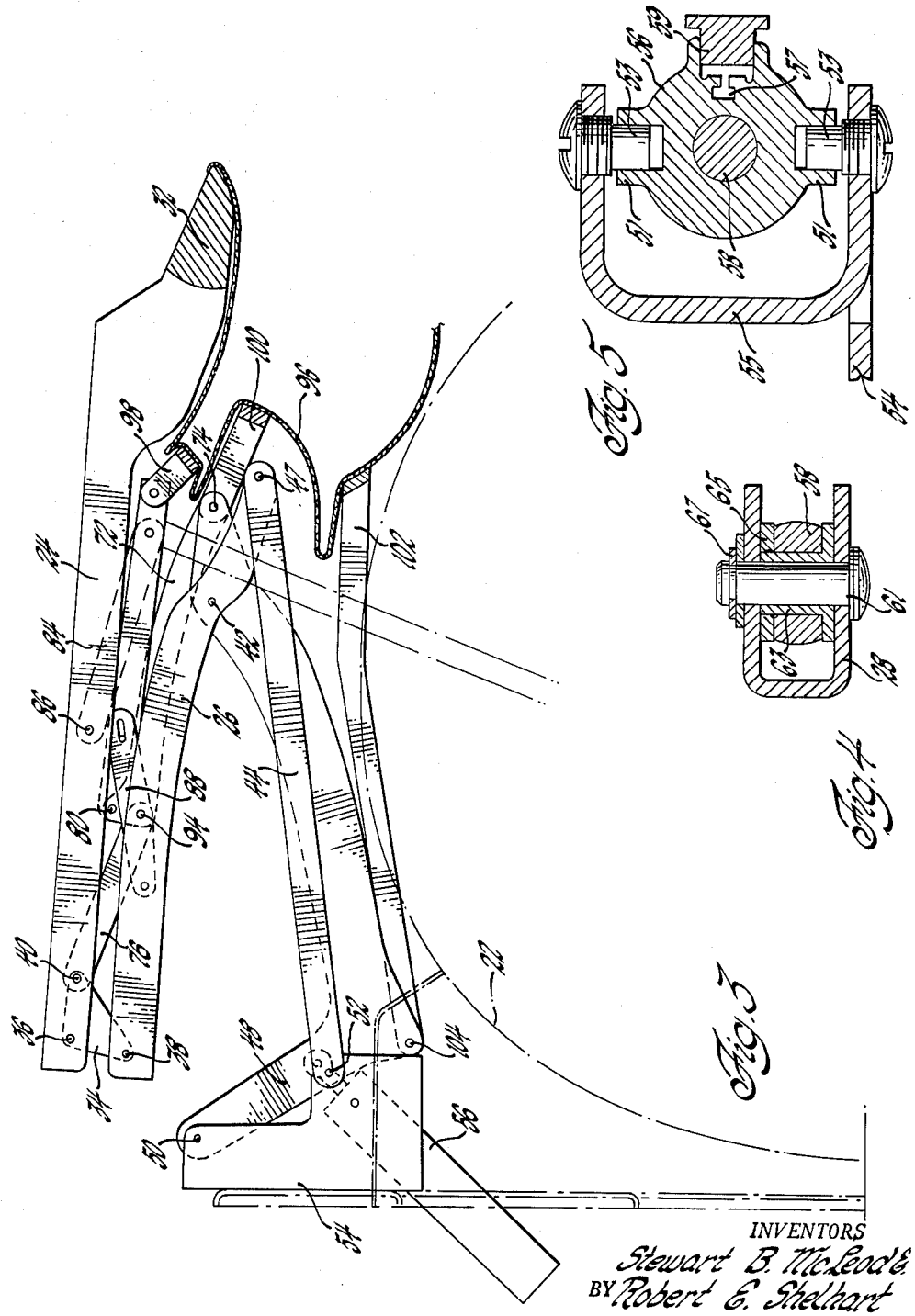

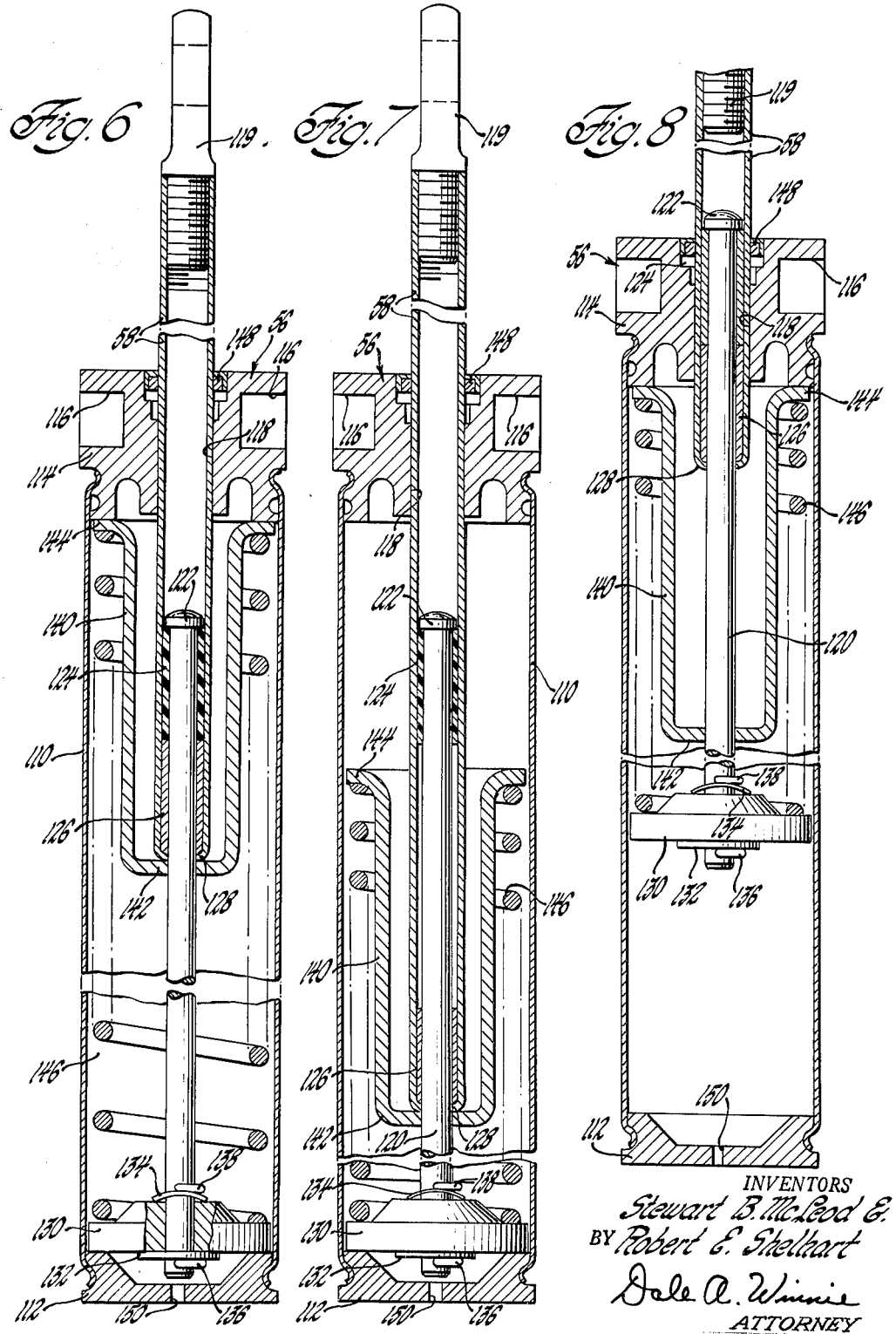

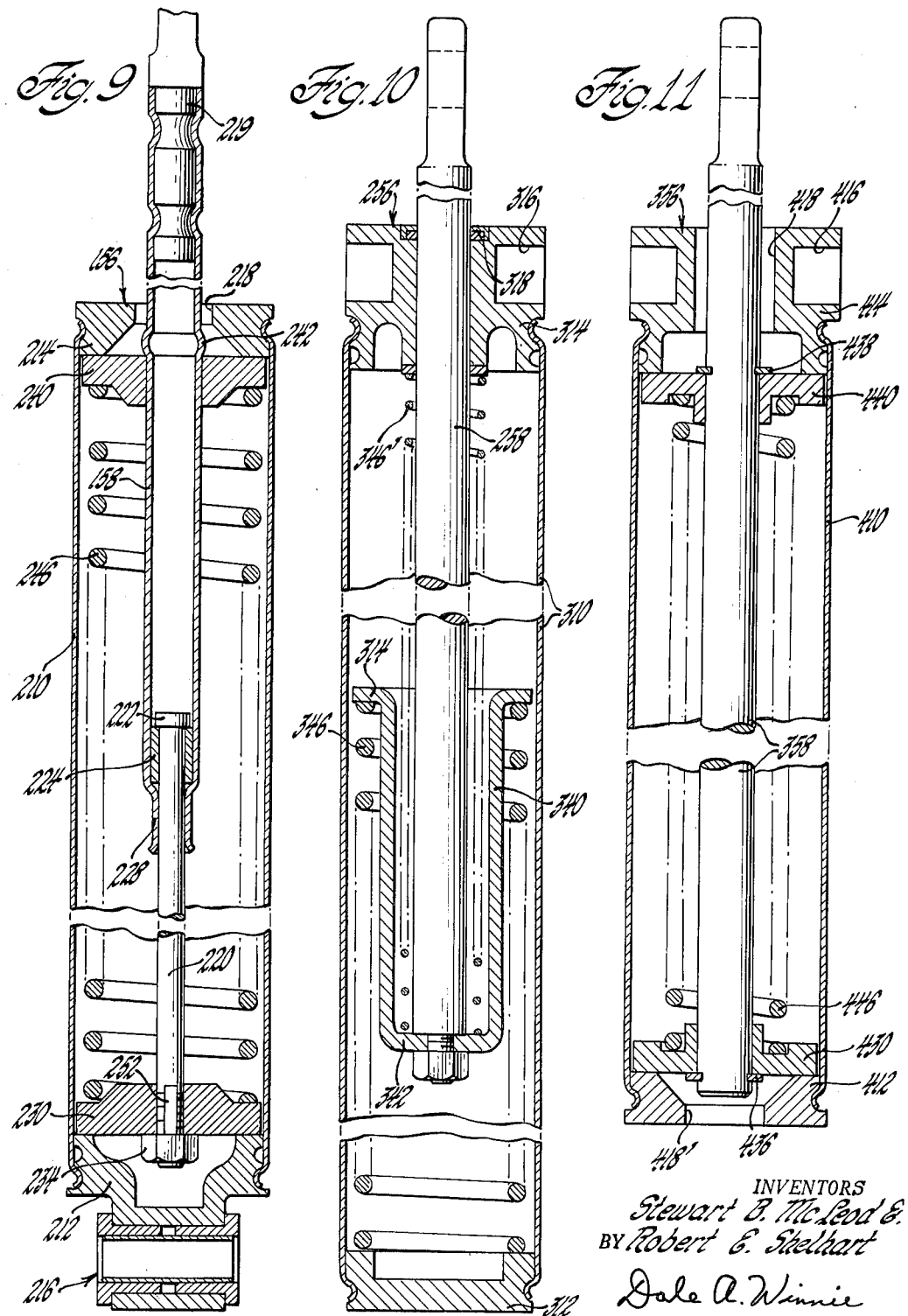

3,235,303
CONVERTIBLE TOP
Stewart B. McLeod, Southfield, and Robert E. Shelhart, Dearborn, Mich., assignors to Dura Corporation, Oak Park, Mich., a corporation of Michigan
Filed Jan. 8, 1963, Ser. No. 250,070
6 Claims. (Cl. 296—117)

This invention relates to convertible top structures for motor vehicles and more particularly to manually operated convertible tops and counterbalancing mechanisms for use therewith.

Convertible tops generally include a fabric covered framework made up of articulated side rails, interconnecting crossbows and a suitable operating linkage for raising and lowering the top between a stored and erected position enclosing the passenger space of a vehicle body.

Most convertible tops are operated by some form of power mechanism, including either hydraulic cylinders or gear motors with related fluid or electrical components of such systems. However, manually operated convertible tops have been used in the past and are still in use on small sports cars and economical transportation vehicles. In general, manual tops have been considered impractical for use on larger vehicles having front and rear passenger seats because of their size and weight and the attendant difficulty of unfolding and erecting the top, or lowering the top from an erected position and over and back into storage.

The recent trend to personal and compact cars for small family and second-car use by suburban housewives and commuters has revived interest in manually operated convertible tops. There is a demand in this market for convertible vehicles and the smaller cars that make use of a manually operated top feasible. Further, economy can be realized in eliminating the power equipment, its installation, adjustment and service, and enables the cost of the compact convertible to be held in line with other cars in its field.

As mentioned, one of the principal problems in manipulating any convertible top manually is its weight and the fact that it must be lifted and extended or collapsed to an over-center position before there is any gravitational assistance.

A further problem is in getting the top started from either its erected and semi-locked position or its collapsed and housed position without placing undue twisting stress on the structure.

These and other problems in the operation of a manual top structure give rise to the need for some means of counterbalancing the weight of the convertible top and to thereby and otherwise make the top easier to operate. At the same time, quite obviously, such means must be considerably less expensive than power operating mechanisms. As a practical matter this dictates means which are mechanical in principle and simple in construction for ease in assembly and installation and for freedom from maintenance and service problems.

It is an object of this invention to provide a manually operated convertible top mechanism which is simple in construction and easy to operate.

It is an object of this invention to provide a simple mechanism for use with a conventional type convertible top structure which affords mechanical assistance in the manual operation of the top structure.

It is also an object of this invention to provide a mechanical device for use with convertible top structures and which affords adequate counterbalancing of the weight of the top structure and makes manual operation thereof much easier.

Another object of this invention is to provide a simplified inexpensive mechanical means of counterbalancing the weight of the top structure and one which is readily interchangeable with power operating means to preclude any production variations as a consequence of using one or the other of such opertaing systems.

More particularly, it is an object of this invention to provide means for counterbalancing and providing assistance to manual operation of a convertible top which includes a coiled compression spring housed within a conventional type hydraulic cylinder casing. In the same regard, this invention contemplates the use of a single-coiled compression spring adapted for dual use in an assembly which may be either trunnion supported or mounted on the floor as used in a convertible vehicle for its intended purpose.

These and other objects and advantages to be gained in the practice of this invention will be more fully understood and appreciated upon reading the following description of a preferred embodiment of this invention, and certain modifications thereof, with reference to the accompanying drawings.

In the drawings:

FIGURE 1 is a vertical section through a convertible top shown in the erected or extended position and with certain parts of the vehicle body shown in phantom outline. It is to be appreciated that the near side of the top operating linkage is shown and that such linkage is duplicated on the far side of the vehicle.

FIGURE 2 is a similar view of the convertible top shown by FIGURE 1 with the top shown in an intermediate operative position.

FIGURE 3 is a similar view of a convertible top shown by FIGURES 1 and 2 in a folded or collapsed position.

FIGURE 4 is a cross-sectional detailed view of a part of the operating structure as seen in the plane of line 4—4 of FIGURE 1 and looking in the direction of the arrows.

FIGURE 5 is a cross-sectional view of another detailed feature as seen in the plane of line 5—5 of FIGURE 1 and looking in the direction of the arrows.

FIGURE 6 is an enlarged cross-sectional view of the operative device used with the convertible top structure of FIGURES 1–3 for counterbalancing the weight of the top and providing mechanical assistance in the manual operation thereof.

FIGURES 7 and 8 are similar to FIGURE 6 with the connecting rods and related operative mechanism shown in different counterbalancing positions in the different views.

FIGURES 9, 10 and 11 are cross-sectional views of other forms of counterbalancing mechanisms incorporating the principles of this invention.

In the description which follows, and claims following thereafter, the words "upper" and "lower" have been used to designate the relative positions of certain parts. It is to be understood that such designation is for convenience only and is not intended to specify the actual positions of the parts in use.

Referring to the drawings in further detail, and particularly to FIGURES 1–3, a vehicle body 10 is shown in phantom outline and is provided with a convertible top 12. The vehicle body 10 is shown sufficiently to identify the windshield 14 having a header bar 16, a rear seat 18 behind which is provided the trunk area and space receptive of convertible top 12 in its collapsed or folded position. The rear axle hump 20, vehicle belt line 21, and rear wheel housing 22 are also shown and identified for general reference purposes.

The convertible top 12 is the folding fabric covered type. It includes articulated side rail members, interconnecting crossbows and a suitable operating linkage.

In subsequent discussion reference made to the "forward" or "rear" ends of links, rail sections, etc., is in regard to the position of such parts when the top is in its erected position as shown in FIGURE 1.

The side rail members of the top structure are identical for each side of the vehicle and include a front side rail section 24. The side rail sections are interconnected by the crossbows and are connected to an operative mechanism 30 anchored to the side walls of the vehicle body 10 and obscured within a housing provided in the rear seat passenger compartment area. The operative mechanism 30 is connected to the side rails by suitable operating linkage in the manner to be later described.

The front side rail section 24 has a top header 32 formed and secured thereto for engagement with the windshield header bar 16. A pivot plate member 34 is connected to the rear end of the front side rail section 24 and to the forward end of the center rail section 26. The pivot plate is triangular and U-shaped in cross section with spaced pivot connections 36 and 38 for engagement with the front and center side rail sections 24 and 26 respectively and an operating link pivotal connection 40 disposed apart therefrom.

The rear side rail section 28 is pivotally connected to the center rail section 26 at 42, as mentioned, and includes a transversely disposed right angle end 48 which is pivotally connected at 50 to a mounting bracket assembly 52. The mounting bracket assembly 52 includes a bracket member 54 which is secured to the inner side wall of the vehicle body 10.

A cylindrical housing or casing member 56 is shown as mounted on the bracket 54. The unit is the same size and length as a hydraulic cylinder unit which would be used for power operation of the convertible top described. However, in the present instance the cylindrical member includes counterbalancing mechanism to assist in manual operation of the top as will later be described.

As shown by FIGURE 5, the cylinder 56 is formed to include bosses 51 at its upper end which are receptive of pivot pins 53 provided on a trunnion bracket member 55. It also includes the normal fluid passageway connection 57 of the hydraulic cylinders, but this is closed by a plug 59 since the cylinder is not used in the same way.

The construction and use of the cylinder 56 will subsequently be described in greater detail. For the present it will suffice to mention that the trunnion mounting precludes the necessity of anchoring the cylinder to the floor of the vehicle body 10. This in turn makes the unit a more integral part of the top sub-assembly to the vehicle body. Accordingly, the convertible top assembly is such as may be pre-adjusted for operational efficiency and subsequently assembled in a vehicle body.

The cylinder 56 includes a connecting rod 58 which is pivotally engaged to the rear side rail section 28 as at 46 and is operative of the top structure therethrough. The side rail section 28 is channel shaped in cross-section, as shown by FIGURE 4, and has the eye-bolt headed end of the connecting rod 58 engaged on a pivot pin 61 extending through the channel side walls. A suitable bearing sleeve 63, spacer 65 and lock ring 67 complete the rod connection to the top assembly.

A balance link 44 is pivotally connected to the bracket member 54 as at 52 and to the end of the center frame rail section 26 as at 47.

The convertible top 12 is erected and folded back into a housed position by means of the top operating linkage 70; part of which includes the rear side rail section 28 and the balance link 44. It also includes a power or thrust link 72 which is pivotally connected at 74 to the forward end of the rear side rail section 28. The thrust or power link 72 includes an extension part 76 which is connected at 40 to the pivotal plate member 34; the plate member 34 serving as the hinge between the front and side rail sections 24 and 26.

The operating linkage 70 also includes an operating link 78 which has one end pivotally connected at 80 to the thrust link 72 and the other end connected at 82 to the front rail control link 84. The latter link is pivotally connected at 86 to the front side rail section 24 at an intermediate location between the ends thereof. The top operating linkage 70 also includes a rocker arm member 88 which has one end pivotally connected at 90 to the center rail section 26. The other end includes a cam slot groove connection 92 with the operating link 78. The rocker arm 88 is pivotally connected at 94 to the thrust or power link 72.

The convertible top 10 includes the fabric material covering 96 which is secured to the top header 32 and extends rearwardly over supporting crossbows. A forward crossbow 98 is provided near the pivotal junction 82 between the operating link 78 and the front rail control link 84. A center crossbow 100 is provided at the pivotal junction 74 of the rear side rail section 28 and the thrust link 72. A rear crossbow 102 is pivotally connected at 104 to the rear side rail section 28. The fabric top is finally anchored to the rear deck end 106.

As will be appreciated the fabric top material 96 is secured to the spaced crossbows 98, 100 and 102 such that they are erected when the convertible top 12 is fully extended and the fabric is pulled taut. Likewise, it will be understood that when the convertible top 12 is retracted or collapsed the crossbows are folded down with the top fabric 96 folded therebetween.

FIGURES 6 and 8 are cross-sectional views of the cylinder 56 which forms part of the operative mechanism 30, as previously mentioned, and shows the structure thereof in further detail.

The cylinder 56 includes a cylindrical casing or shell 110 having closures 112 and 114 provided in opposite ends thereof. The terminal ends of the casing or shell 110 are crimped into annular grooves formed in the end closures 112 and 114 to provide a more or less conventionally known type of hydraulic cylinder member. This construction is of particular significance in that it exemplifies the fact that the operative device under discussion is capable of being housed within the chamber area of a hydraulic fluid cylinder and, accordingly, that the operative device is therefor interchangeable with hydraulic fluid cylinder means normally used with power operated convertible top mechanisms.

Suitable axially aligned recesses 116 are provided within diametrically opposite sides of the end closure 114 to afford means for trunnion support of the cylinder member 56.

The connecting rod 58 extends through a bearing support passage 118 provided in the end closure member 114. The rod member is tubular in cross section and includes an eye-bolt fitting 119 threaded within its extended end. It also includes a solid rod member 120 telescopically engaged within the other end thereof and disposed within the cylinder case 110.

The telescopic rod extension 120 is formed to include a head 122 received within the tubular connecting rod 58. Bearing sleeve 124 is press fitted on the rod near the headed end thereof and bearing sleeve 126 is press fitted in the end of the tubular connecting rod 58 near the inwardly turned end 128 of the telescopic connection. As later shown, this provides spaced bearing supports for the members as telescoped together.

A spring seat member 130 is provided on the end of the rod extension 120. Plain and spring washers 132 and 134 are provided on the rod, with the spring seat member 130 therebetween, and spring clips 136 and 138 retain the spring seat member in fixed relation on the rod as shown.

Within the cylindrical shell 110 is also disposed a deep drawn cup-shaped spring seat member 140. It includes a bottom wall part 142 through which the rod extension 120 extends. The spring seat member 140 also includes an annular lip 144 near its upper edge which is positioned for stop engagement with the end closure 114 as shown in FIGURE 6.

A coiled compression spring 146 is provided within the cylindrical casing 110 between the fixed spring seat member 130 and the underside of the annular lip 144 of the spring seat member 140.

A felt or other form of wiper seal 148 is provided within the end closure 114 and a suitable condensation drain 150 is shown provided through the end closure 112.

The structure described will be noted to provide a form of telescopic connecting rod 58 having bearing support at the closure end 114 in the spring seat member 130, and between the telescopic parts in the use of the bearing sleeves 124 and 126.

With reference to FIGURES 7 and 8 it will be seen that the effective length of the connecting rod 58 may be shortened within the cylinder case 110 by compression of the spring 146 against the spring seat member 130. In such instance the inturned end 128 of the tubular rod part 58 carries the deep drawn cup-shaped spring seat member 140 downwardly about the rod extension 120 to cause the compression of the spring 146 near the bottom of the cylinder 56.

Conversely, the effective length of the connecting rod 58 may be extended by being withdrawn from the cylindrical casing 110. In such instance, the telescopic extension 120 is drawn out with the rod 58 which in turn raises the spring seat member 130 to compress the spring 146 against the movable seat member 140 which is seated against the end closure 114 as shown in FIGURE 8. The coil spring is accordingly compressed within the upper part of the cylinder 56 in such instance.

The compression spring 146 is at all times under a compressive load. In the neutral position of FIGURE 6 the spring is sufficiently loaded to hold the spring seat members 130 and 140 engaged with the end closures at opposite ends of the cylinder 110. The spring is further compressed when the connecting rod is fore-shortened within the cylinder as shown by FIGURE 7. The spring 146 is also compressed when the connecting rod 58 is withdrawn from the cylinder as shown by FIGURE 8.

In actual use with the convertible top 12 the cylinder 56 serves as follows:

When the top 12 is collapsed and folded away in the storage space 19, the connecting rod 58 is retracted within the cylinder case 110 and the spring 146 is compressed as shown by FIGURE 7. The spring is of sufficient strength under full compression in the stored position of the top to counterbalance the weight of the top and, preferably, should require some slight manual effort to seat the top fully in storage. This over balance is particularly advantageous with a top structure having an operating linkage designed for rattle-free biasing of the operating links when the top is in storage since it will aid in freeing the links when the top is to be erected.

In erecting the convertible top 12, the spring 146 acts through the connecting rod 58 and provides counterbalancing assistance for the weight of the top structure. The spring pressure is greatest at the outset and diminishes as the top is raised towards an upwardly and forwardly extended position just beyond that shown by FIGURE 2.

Subsequently, as the top passes over-center, the connecting rod 58 passes through the condition shown by FIGURE 6, where the spring 146 is fully extended, picks up the rod extension 120, and begins to compress the spring within the top part of the cylinder case 110 as shown by FIGURE 8; arriving at such position when the top is fully erected.

The resistance of the spring 146 to compression counterbalances the weight of the top 12 in traveling over-center and damps out any sudden drop. As before, it may also overbalance the weight of the top when fully compressed to afford a freeing effort for an operating linkage that is designed for rattle-free biasing when the top is fully erected.

With the spring 146 under compression as shown by FIGURE 8, when the top is fully erected, upon its release from the windshield header bar 16, there is a counterbalancing force for the weight of the top which makes it much easier to lift and raise the top back into storage. In storage, the spring is again compressed and the counterbalancing force again made available, as shown by FIGURE 7.

Another form of actuator cylinder 156 is shown by FIGURE 9.

The cylinder 156 includes a cylindrical case or shell 210 similar to that shown in FIGURES 6–8. It has end closures 212 and 214 and the shell ends are in crimped engagement therewith. A non-bearing support access 218 is provided through the one end closure 214. The connecting rod 158 is tubular in cross section as before and, in the present instance, includes an eye-bolt fitting 219 held in crimped engagement with the extended end of the tubular connecting rod.

A telescopic rod extension 220 is engaged within the tubular end of the connecting rod 158 within the cylindrical shell 210. The rod is formed to include a head 222 and has a bearing sleeve 224 which is in press-fitted engagement therewith near the headed end. The swaged end 228 of the tubular connecting rod serves as a further bearing support for the rod.

In the construction of the cylinder 156 shown by FIGURE 9, the spring seat member 230 is provided on the extension rod 220 and may be held thereto by threaded engagement as shown at 232 and by means of the lock nut 234.

The spring seat member 240 is provided on the inner end of the connecting rod 158 rather than about the extension rod as in the cylinder construction previously discussed. A bulbular stop 242 is provided about the connecting rod 158 to afford a means for moving the spring seat member 240 downwardly into the cylindrical case 210. In so doing, the tubular rod 158 telescopes over the extension 220 and the spring 246 is compressed in the manner previously described.

It will be appreciated that in withdrawing the connecting rod 158 from the cylinder the spring seat member 230 will compress the spring 246 within the upper end of the cylinder member in the manner previously described. In such instance the enlarged opening 218 within the closure 214 is necessary for the stop 242 to be withdrawn therethrough.

The cylinder 156 of FIGURE 9 is shown to include a floor mounting support 216 which is generally known and is accordingly not described in any detail. The cylinder serves in the same manner as the preferred embodiment previously described.

Referring now to FIGURE 10, the cylinder 256 is generally similar to the two cylinders previously described and includes the cylindrical casing 310, end closures 312 and 314 with the cylinder crimped in engagement therewith, and trunnion recesses 316 within the end closure 314. A journal support access 318 is provided through the end closure 314 and, in the present instance, a connecting rod 258 is of solid construction rather than being tubular.

There is no telescopic extension used in this construction.

A deep drawn cup-shaped spring seat member 340 is secured to the end of the connecting rod and a compression spring 346 is engaged between the under side of the annular lip 314 of the spring seat member and the end closure 312 while a second compression spring 346' is disposed about the connecting rod and is engaged between the bottom wall 342 of the spring seat member 340 and the end closure 314.

When the connecting rod 258 is withdrawn from the cylinder case 310 spring 346' is compressed and spring 346 is relieved in part. Conversely, when the connecting rod 258 is extended into the cylinder case spring 346 is compressed and spring 346' is relieved in part.

The cylinder 256 serves in essentially the same manner in the raising and lowering of the convertible top 12 as described with respect to cylinder 56.

The cylinder 356 shown by FIGURE 11 again includes the same general type of construction with a cylindrical shell or case 410 having end closures 412 and 414 crimped in engagement with the ends thereof. The same form of trunnion support recesses 416 are provided within the one end closure 414. However, in this instance, suitable enlarged access passages 418 and 418' are formed through the rod respective end closures. Suitable spring seat members 430 and 440 are provided on the inner end of the solid connecting rod 358 and suitable lock rings 436 and 438 are provided outboard thereof to pick up their respective spring seat members in the course of rod movement in opposite directions. A single coil compression spring 446 is provided about the connecting rod between the two spring seat members and holds them in the relative relation shown in FIGURE 11.

It will be appreciated that when the connecting rod 358 is moved downwardly into the cylinder 410 that it will carry with it the spring seat member 440 and compress the spring 446 within the bottom end of the cylinder. At the same time, the connecting rod will extend through the access opening 418' in the end closure 412.

When the connecting rod 358 is withdrawn from the cylinder 410 it will carry with it the spring seat member 430 and compress the spring 446 within the upper end of the cylinder.

The enlarged accesses 418 and 418' enable the lock rings 436 and 438 to pass through the end closures.

From the foregoing description of a preferred embodiment of this invention and several variations thereof, it will be appreciated that certain modifications and improvements are within the scope and spirit of the invention as herein set forth. Accordingly, the invention should be viewed as inclusive of all such innovations as are not specifically excluded by the language of the hereinafter appended claims.

We claim:

1. In a convertible top structure for a vehicle having a plurality of members pivotally interconnected and movable from a rearward folded position to an extended open position; means for storing energy when said top structure is in the extended open and in the folded rearward positions to initially assist in the folding and unfolding of the top structure; said energy storing means comprising a cylinder; head members closing opposite ends of the said cylinder; means mounting said cylinder to a rigid member of the vehicle; a first piston rod mounted for sliding movement through one of the cylinder head members; means connecting the extended end of the first piston rod to at least one of the pivotally interconnected members forming the top structure; a second piston rod telescopically mounted in relationship to said first piston rod; a sleeve mounted for sliding movement within the cylinder and telescopically relative to said first and second piston rods; and a helical spring means mounted in said cylinder and urging said second piston rod and sleeve into spaced longitudinal relationship to thereby bias the top structure into a position intermediate the folded and the open positions, whereby movement of the top structure in either direction from said intermediate position compresses the spring means and exerts a torque on said piston rod and said top structure.

2. In a convertible top structure for a vehicle having a plurality of members pivotally connected and movable from the rearward folding position to an extended open position, means for storing energy when said top structure is in the extended open and the rearward folded positions to initially assist in folding and unfolding the top structure, said energy storing means comprising a cylinder, head members closing opposite ends of said cylinder, means mounting said cylinder to a rigid member of the vehicle, a first hollow piston rod mounted for sliding movement through one of the cylinder head members, means connecting the extended end of the first piston rod to at least one of the pivotally connected members forming the top structure, a second piston rod mounted for sliding movement within the first piston rod, a piston mounted on the extended end of said second piston rod for sliding movement within the cylinder, cooperating stop means associated with said first and second piston rods to restrict the telescopic movement therebetween, a sleeve mounted for sliding movement within the cylinder and for limited sliding movement relative to said first and second piston rods, flange means carried at one end of said sleeve and positioned adjacent said one head member of said cylinder, and helical spring means in said cylinder about said first and second piston rods and said sleeve, one end of said helical spring means positioned in abutting relationship to the flange on said sleeve and the other end of said helical spring means positioned in abutting relationship to the piston secured to said second piston rod and cooperating means on said first piston rod and said sleeve for limiting the telescopic movement between said first piston rod and said sleeve.

3. The invention defined in claim 2 wherein said helical spring means maintained in said cylinder urges the first piston rod to a position such that the top is in a position intermediate the folded and the open positions, whereby movement of the top structure in either direction from the said intermediate position compresses the spring means and exerts a torque on said first piston rod and said top structure.

4. In a convertible top structure for a vehicle having a plurality of members pivotally connected and movable from a rearward folded position to an extended open position, means for storing energy when said top structure is in the extended open and the rearward folded positions to initially assist in folding and unfolding the top structure, said energy storing means comprising a cylinder, head members closing opposite ends of said cylinder, means mounting said cylinder to a rigid member of the vehicle, a piston member slidably mounted in said cylinder, a piston rod engaging said piston member and extending through one of said cylinder head members, a spring seat member mounted in said cylinder for axial sliding movement with said piston rod, a compression spring provided in said cylinder about said rod and between said spring seat and said piston member, said piston rod including parts telescoping together in the reciprocal movement of said rod in and out of said cylinder, one of said telescoping rod parts engaging said spring seat member for movement thereof towards the piston member and the compression of said spring therebetween in the reciprocation of said rod in one direction, and the other of said telescoping rod parts having said piston member provided thereon for compression of said spring between the piston member and the spring seat in the reciprocating movement of said rod and said piston member in the opposite direction, and means connecting said piston rod extending through said one of the cylinder head members to the pivotally interconnected members forming the top structure.

5. The invention defined in claim 4 wherein the compression spring mounted in said cylinder biases the top structure through the piston rod to a position intermediate the folded and the open positions thereof whereby all movement of the top structure in either direction from said intermediate position compresses the compression spring and exerts a torque on said piston rod and said top structure.

6. A spring type counterbalance assembly comprising a cylinder, head means closing opposite ends of the cylinder, a first piston rod mounted for sliding movement through one of the cylinder head means, a second piston rod mounted for sliding movement within the cylinder and for sliding movement relative to the first piston rod, a piston mounted on the end of the second piston rod adjacent the other cylinder head means, cooperating stop means associated with the first and second piston rods to restrict the relative sliding movement therebetween, a sleeve mounted for sliding movement within the cylinder and for limited sliding movement relative to said first and to said second piston rods, flange means carried at one end of the sleeve and positioned adjacent said one head means of said cylinder, and helical spring means in said cylinder about said first and second piston rods and said sleeve, one end of the helical means positioned in abutting relationship to the flange on said sleeve and the other end of the spring means positioned in abutting relationship to the piston secured to said second piston rod.

References Cited by the Examiner
UNITED STATES PATENTS

| | | | |
|---|---|---|---|
| 1,221,669 | 4/1917 | Buch | 296—116 |
| 2,365,765 | 12/1944 | Keller. | |
| 2,372,214 | 3/1945 | Loepsinger | 267—1 |
| 2,437,631 | 3/1948 | Wood | 267—1 |
| 2,621,005 | 12/1952 | Turpin | 267—1 X |
| 2,949,270 | 8/1960 | Wood | 267—1 X |
| 3,036,859 | 5/1962 | Adamski | 296—116 |

A. HARRY LEVY, *Primary Examiner.*

ARTHUR L. LA POINT, *Examiner.*